July 3, 1962　　　　M. W. HAZELTON ET AL　　　　3,041,963
STOP DEVICE FOR PRESS BRAKES AND THE LIKE
Filed Jan. 2, 1959　　　　　　　　　　　　　　3 Sheets-Sheet 1

INVENTORS.
MERRILL W. HAZELTON
AND CARL J. OSTENDORF,
BY
ATTORNEYS.

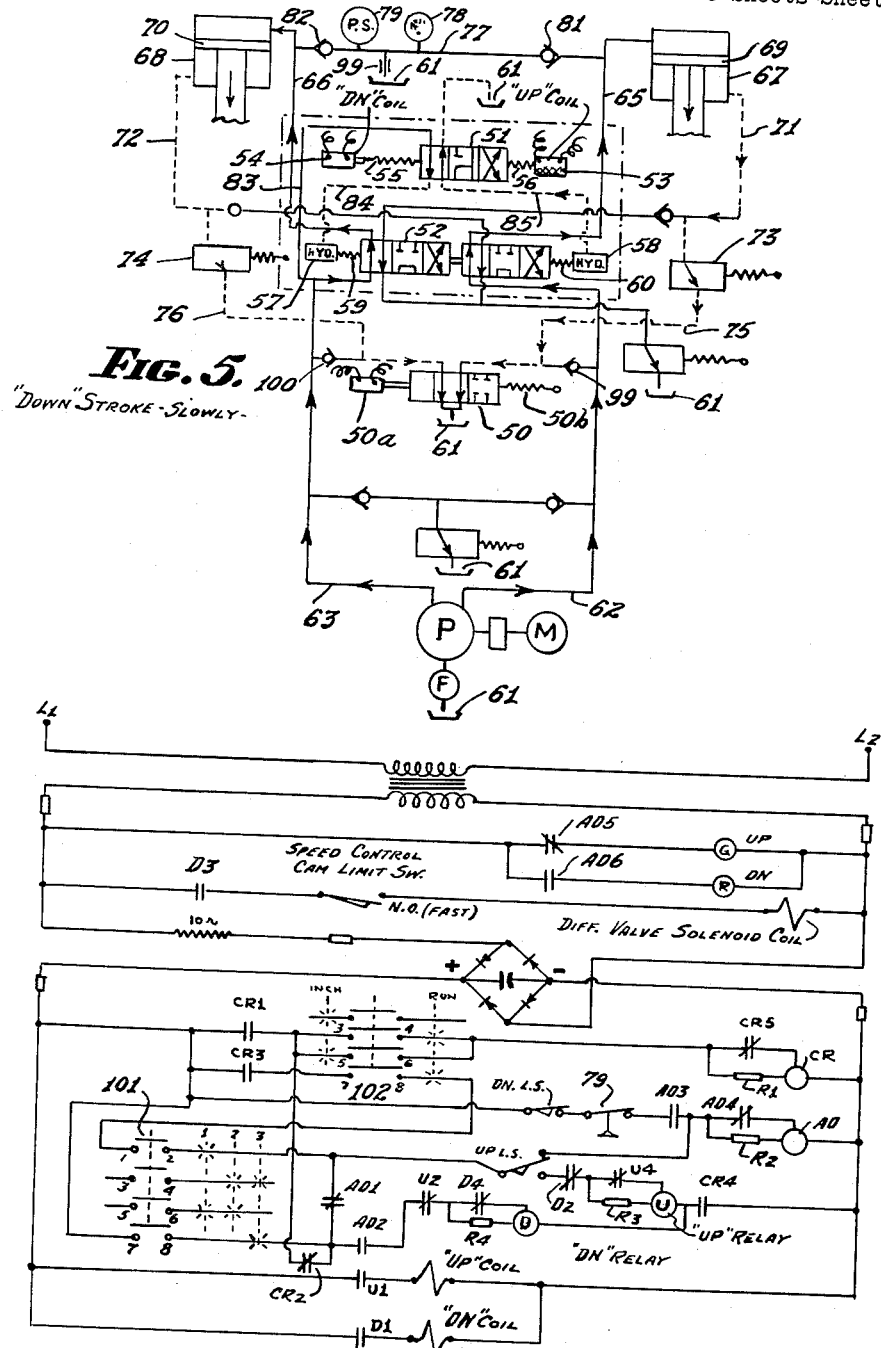

July 3, 1962 M. W. HAZELTON ET AL 3,041,963
STOP DEVICE FOR PRESS BRAKES AND THE LIKE
Filed Jan. 2, 1959 3 Sheets-Sheet 3

"UP" STROKE a SLOW
b FAST a
b "UP"
c "DN"

a
b "UP"
c "DN"

INVENTORS.
MERRILL W. HAZELTON
AND CARL J. OSTENDORF,
BY
Allen & Allen
ATTORNEYS.

United States Patent Office 3,041,963
Patented July 3, 1962

3,041,963
STOP DEVICE FOR PRESS BRAKES AND THE LIKE
Merrill W. Hazelton and Carl J. Ostendorf, Cincinnati,
Ohio, assignors to The Cincinnati Shaper Company,
Cincinnati, Ohio, a corporation of Ohio
Filed Jan. 2, 1959, Ser. No. 784,499
12 Claims. (Cl. 100—256)

This invention relates to a stop device for press brakes and the like. Thus, for example, with minor modifications which will be obvious to one skilled in the art, the device may be adjusted for use with a shear. More particularly, it relates to an adjustable stop to stop the ram of a brake or the knife of a shear at the bottom and top of its movement.

Press brakes are called upon to exert tremendous pressures on the work which is being formed. No matter how rigid and heavy the frame of the brake is, there is a small movement when the ram is exerting maximum pressure against the bed which tends to bend the frame structure of the brake. Thus, if the bottom stop for the brake is mounted on the frame, it is not possible to obtain a precise adjustment of the bottom stop because the stop is subjected to a small amount of relative movement with respect to the bed.

It is also desirable to be able to adjust the position of the bottom stop from the front of the machine and it is desirable to have indicating means to give an exact indication of the position of the bottom stop. These should also be at the front of the machine where the operator has easy access to them.

With the foregoing considerations in mind, it is an object of the present invention to provide a bottom stop arrangement whereby the position of the bottom stop is fixed with respect to the bed of the machine and is not affected by any bending or stretching of the framework of the press during its operating cycle.

It is another object of the invention to provide such an arrangement wherein the position of the bottom stop may be adjusted from the front of the machine to provide in connection with the adjusting means an indicating means to show visually the position of the bottom stop.

It is a further object of the invention to provide an adjustable top stop and to provide stops as above outlined which cannot be broken in the event of a malfunction of the electrical or hydraulic circuit. It is another object of the invention to provide means for adjusting the top stop and clamping it in a desired position of adjustment.

Ancillary to the foregoing objects, it is a further object to provide a switch actuating cam and to provide means for adjusting said cam and clamping it in adjusted position.

These and other objects of the invention which will be pointed out in greater detail hereinafter or which will be apparent to one skilled in the art upon reading these specifications, we accomplish by that certain construction and arrangement of parts of which we shall now disclose an exemplary embodiment.

Reference is made to the drawings forming a part hereof and in which:

FIGURE 5 is a hydraulic flow diagram of the press brake showing only so much of the flow system as is necessary to an understanding of the present invention.

FIGURE 6 is a wiring diagram showing only so much of the electrical system as is necessary to an understanding of FIGURE 5.

Figure 1:
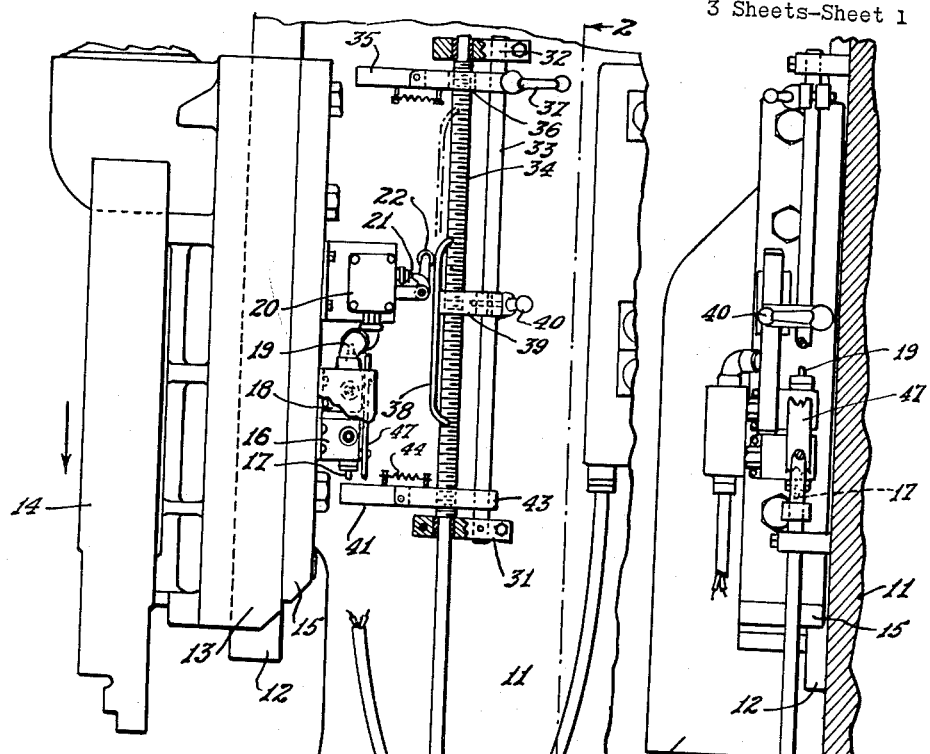
FIGURE 1 is a fragmentary side elevational view with parts in section of a press brake showing the structure of the various stops and the control mechanism.

Briefly, in the practice of the invention we provide a bracket firmly secured to the bed of the press brake and extending rearwardly therefrom and carrying at its rearward end a pair of mating bevel gears. A horizontal shaft has a bearing in the bed plate of the brake and is secured to one of the bevel gears and is provided at the front of the machine in the front of the bed with a hand wheel for rotating it and with an indicator mechanism. A vertical shaft is secured to the other bevel gear and is guided by slidable engagement with a pair of guide members which are secured to the side plate of the press brake. In this way, if there is a slight tendency to bend the frame or spring the frame while the ram is exerting pressure against the bed, the vertical shaft maintains its orientation with respect to the bed and not with respect to the frame. A vertical clamping rod is provided adjacent the vertical shaft and a top stop having a hole with clearance for the passage of the vertical shaft and having means for clamping it to the clamping rod in a desired position of adjustment is provided. Similarly, a cam plate is mounted slidably with respect to the clamping rod and has clearance for the passage of the vertical shaft and can be clamped in a desired position of adjustment.

A bottom stop has sliding engagement with the clamping rod by threaded engagement with the vertical shaft so that as the vertical shaft rotates the bottom stop member is moved upward or downward depending upon the direction of rotation. The top and bottom stops are positioned to engage respective limit switches secured to the ram and the cam plate is positioned to engage a cam follower associated with a cam operated switch.

Referring now in more detail to the drawings, the press brake is shown as having a bed 10 and a heavy side plate 11. The side plate (and there will of course be another side plate at the other end of the machine) carries a guide 12 which is engaged by members 13 secured to the ram 14. The member 13 is retained in association with the guide 12 by a back plate 15 which is bolted to the member 13 as shown. The movement of the ram upward and downward is accomplished by means of hydraulic cylinders and pistons (shown only in FIGURES 5 and 7).

Figure 2:
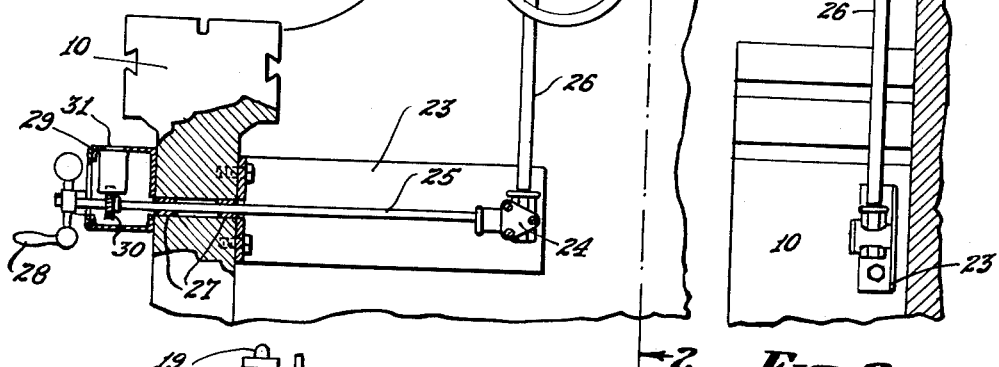
FIGURE 2 is a cross-sectional view of the same taken on the line 2—2 of FIGURE 1.

A series of switches to control the operation of the ram are bolted to the backing plate 15 as best seen in FIGURES 1 and 2. The switch 16 is the down limit switch having the actuating element 17, 18 is the up limit switch having the actuating element 19 and 20 is a cam actuated switch to actuate the hydraulic differential valve (described hereinafter) to change from fast to slow speed. The switch 20 is shown as having an actuating element 21 which is operated by a cam follower 22.

A bracket 23 is bolted to the bed 10 as best seen in FIGURES 1 and 2 and the bracket 23, as clearly seen in FIGURE 2, is free of the side plate 11. Secured to the bracket 23 is the gear housing 24 which contains a pair of bevel gears, one of which is secured to the horizontal shaft 25 and the other to the vertical shaft 26. The shaft 25 has bearings 27 in the bed 10 and carries at its outer end a hand wheel 28 by means of which it may be rotated. A small housing 29 contains an indicator mechanism which may be operated by a worm and gear drive generally indicated at 30 from the shaft 25 so as to indicate through the window 31 the position of the bottom stop.

Secured to the side plate 11 are the guide members 31 and 32. Extending between these guide members and secured thereto is the clamping rod 33. The upper portion of the shaft 26 is threaded as at 34.

The upper stop member indicated generally at 35 has a hole through which the clamping rod 33 passes in a sliding fit and it has a hole 36 through which the threaded portion 34 of the shaft 26 may pass with clearance. Thus, the top stop 35 may be adjusted in regard to its vertical position and clamped to the clamping handle 37.

Similarly, a cam plate 38 is secured to a member 39 having a hole for the passage of the threaded portion 34 of the shaft 26 with clearance and having a sliding fit on the clamping rod 33. Thus, the cam plate 38 may be adjusted up or down as desired and clamped to the rod 33 by means of the hand lever 40.

The bottom stop member 41 has sliding engagement with the clamping rod 33 and threaded engagement with the threaded portion 34 of the shaft 26. Thus, it will be clear that as the hand wheel 28 is rotated, the rotation is transmitted through the shaft 25, the bevel gearing in the housing 24 and the shaft 26 so that the bottom stop 41 is moved up or down, depending upon the direction of rotation of the hand wheel 28. As the hand wheel 38 is rotated, the indication of the indicator may be observed through the window 31 in the housing 29. From the foregoing description it will also be clear that the position of the stop 41 in any given position of adjustment remains fixed in relation to the bed 10 and that springing of the machine frame will in no way affect the position of the bottom stop.

It will also be clear that as the ram moves downward, it reaches a position where the actuator 17 of the down limit switch 16 abuts the bottom stop 41 which stops the downward movement of the ram. Similarly, as the ram moves upwardly the actuator 19 of the top limit switch 18 abuts the top stop 35 to stop upward movement of the ram. It will also be clear that as the ram moves, the cam follower 22 will ride up the cam plate 38 thereby actuating the actuator 21 of the switch 20 and that the point at which this actuation takes place can be determined by the position of the member 39 with respect to the clamping rod 33.

Figure 4:
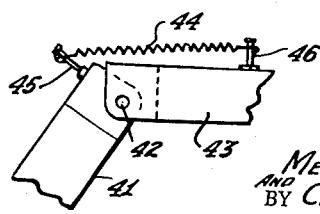
FIGURE 4 is a fragmentary enlarged view of the bottom stop showing the yieldable arrangement thereof.

In order to prevent damage to the mechanisms, the stop members 35 and 41 are provided with a pin connection and a spring so that they may yield in the event of overtravel. With reference to FIGURE 4 showing the details of the bottom stop construction, the stop proper 41 is pinned as at 42 to the portion 43 which engages the clamping rod and the threads 34. A spring 44 extending between a pin 45 on the member 41 and a pin 46 on the member 43 normally hold the bottom stop 41 in the position of FIGURE 1. The spring 44 is sufficiently strong that the actuator 17 is actuated upon contact with a member 41.

Figure 3:
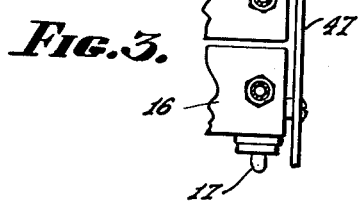
FIGURE 3 is an enlarged detail view of the up and down limit switches showing the switch protecting bar.

Secured to the switches 16 and 18 is a safety plate 47 (FIGURE 3) so positioned that if after the actuator 17 has been actuated there is over-travel as a result of some malfunction, the plate 47 will abut the member 41 which may then swing down to the position of FIGURE 4 against the effort of the spring 44.

It will be understood that the top stop member 35 is constructed in the same way as the bottom stop 41 except that it may yield in an upwardly direction when it is abutted by the upper end of the plate 47.

Figure 7:
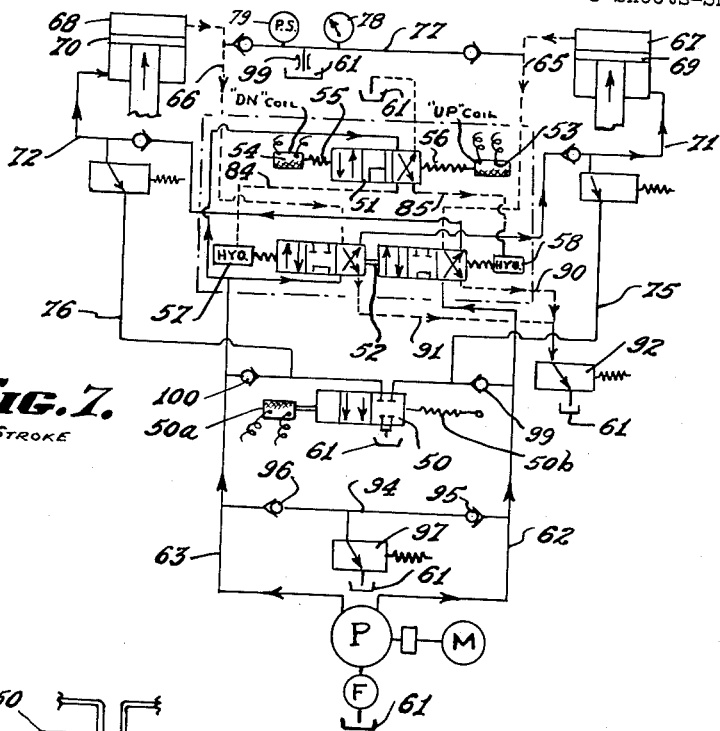
FIGURE 7 is a diagram similar to FIGURE 5 but showing a different position of certain valves.

In the flow diagrams, FIGURES 5 and 7, a differential valve is indicated generally at 50, a pilot valve is indicated generally at 51 and a main valve is indicated generally at 52. Before describing the flow diagrams in detail, reference is made to FIGURES 8 to 10 inclusive which diagrammatically show what these valves do. Thus, in FIGURE 8, there is shown the differential valve 50. This valve is spring urged to the position of FIGURE 8a and is moved to the position of FIGURE 8b by a solenoid indicated in FIGURES 5 and 7 at 50a. The spring is shown at 50b. It will be seen that in the slow position of FIGURE 8a, the two lines leading into the valve are connected with two lines 50c which lead to a sump 61. In the fast position of FIGURE 8b, it will be seen that the two lines leading into the valve at the top are blocked so that there is no flow to the sump.

Figure 9:
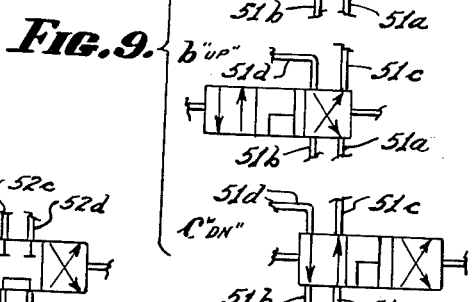
FIGURE 9a is a diagram of the pilot valve in neutral position.
FIGURE 9b is a diagram of the same in up position.
FIGURE 9c is a diagram of the same in down position.

The pilot valve of FIGURE 9 which is indicated generally at 51 has a central neutral position shown in FIGURE 9a and in this neutral position fluid from the lines 51a and 51b passes through the line 51c to a sump and line 51d is blocked. In the up position line 51d is connected to line 51a and line 51b is connected to line 51c as seen in FIGURE 9b. In the down position shown in FIGURE 9c, the connections are simply reversed so that line 51d now connects to line 51b and line 51c now connects to line 51a.

The pilot valve 51 is moved from its neutral position to either the up or down position respectively by the solenoids 53, 54 and springs 55, 56 bias the valve 51 to neutral position when the solenoids 53 and 54 are not energized.

Figure 10:
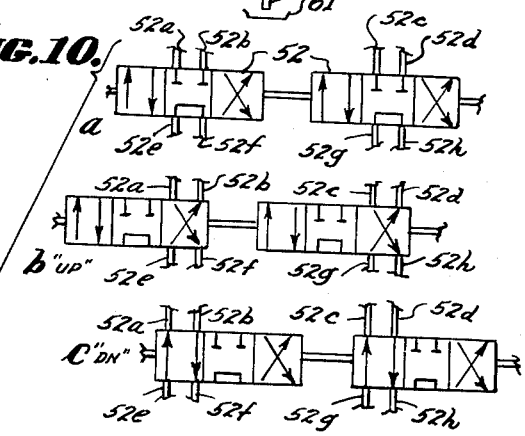
FIGURE 10a is a diagram of the main valve in neutral position.
FIGURE 10b is a diagram of the same in up position.
FIGURE 10c is a diagram of the same in down position.

The main valve 52 is shown in FIGURE 10. The neutral position of this valve is shown in FIGURE 10a and it will be seen that the lines 52a, 52b, 52c, and 52d are blocked and that the line 52e and 52f are connected together and the lines 52g and 52h are connected together.

In the up position as shown in FIGURE 10b, the line 52a is cross-connected to the line 52f while the line 52b is cross-connected to the line 52e. Similarly, the line 52c is connected to the line 52h and the line 52d is connected to the line 52g.

As shown in FIGURE 10c, when the valve 52 is in the down position, the lines 52a and 52e are connected and the lines 52b and 52f are connected. Similarly, 52c is connected to 52g and 52d is connected to 52h.

The valve 52 is hydraulically operated by means of the hydraulic cylinders 57 and 58 and is biased to the neutral position by the springs 59 and 60.

Coming now to a description of FIGURE 5 showing so much of the hydraulic circuit as is necessary to an understanding of the invention, there is shown the flow of hydraulic fluid for a down stroke at slow speed. A sump or reservoir is indicated at 61 and from this fluid is withdrawn through a filter F by a pump P driven by a motor M. The pump utilized is preferably what is known as a split flow type of pump. Such pumps are available on the market and have provision for balancing the flow through the two lines. Fluid from the pump P thus flows through the lines 62 and 63 to the main valve 52 and through the main valve 52 through the lines 66 and 65 to the hydraulic cylinders 67 and 68 above the pistons 69, 70. This produces a downward movement of the pistons, which movement is transmitted in well known manner to the ram. Fluid in the cylinders 67 and 68 below the pistons 69, 70 passes through the lines 71, 72 and the counterbalance valves 73, 74 and the lines 75, 76 to the differential valve 50, which in this instance is in the slow position of FIGURE 8a. The fluid passes through the valve 50 and the line 50c into the sump 61. The fluid pressure in the lines 65, 66 acts upon the line 77 which carries a pressure gauge 78, a pressure switch 79 and which through an orifice 99 communicates with the sump 61. One way valves are provided at 81 and 82.

Because the valve 51 has been moved to down position by the solenoid 54, pilot pressure from line 63 passes through the line 83 to the valve 51. It passes through the valve 51 and the line 84 to the hydraulic cylinder 57 at the left of the valve 52 which moves the main valve to down position. As the main valve 52 moves to down position, fluid in the cylinder 58 is exhausted through the line 85 and through the valve 51 to the sump 61.

Turning now to FIGURE 7 showing the conditions for an up stroke, it will be seen that the valve 51 has moved to up position because the solenoid 54 has been deenergized and the solenoid 53 has been energized, shifting the valve spool. This is the position shown in FIGURE 9b. By virtue of the reversal of flow through the valve 51, the flow from the valve 51 to the valve 52 is reversed and hydraulic fluid from the valve 51 flows through the line 85 to the hydraulic cylinder 58 and at the same time hydraulic fluid from the cylinder 57 is discharged through the line 84 and through the valve 51 to the sump 61. This of course shifts the valve 52 from the down position to the up position which is the position shown in FIGURE 10b. Now fluid pumped by the pump P through the lines 62 and 63 to the valve 52 passes respectively through the lines 72 and 71 to the cylinders 68 and 67 beneath the pistons 70, 69, respectively, causing them to move upward. Fluid above the respective pistons then flows through the lines 66 and 65 through the valve 52 and through lines 91 and 90 to the back pressure valve 92 and thence to the sump 61. Since the differential valve 50 is now in closed position, fluid cannot flow through the lines 76, 75 because it will be blocked at the valve. A line 94 connects between the lines 62 and 63 with check valves 95, 96 and the line 94 communicates through a pressure relief valve 97 with a sump 61.

Figure 8:
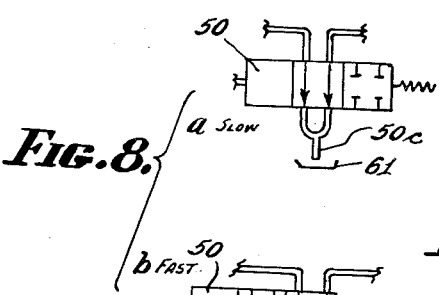
FIGURE 8a is a diagram of the differential valve in the slow position.
FIGURE 8b is a diagram of the same in the fast position.

The effect of shifting the valve 50 as between fast and slow positions can be noted by observation of FIGURES 5 and 8. FIGURE 5 shows this valve in the slow position and as described before the fluid from beneath the pistons flowing through the lines 71 and 72 and through the pressure relief valves 73 and 74 and the lines 75, 76, flows through the valve 50 to the sump 61. It will be clear that if in FIGURE 5 the valve 50 is shifted to the fast position, the flow of fluid coming to the valves 75 and 76 will be blocked at the valve 50. Therefore, the fluid flows through the check valves 99 and 100 and is added to the flow through the lines 62 and 63 going back to the top of the cylinder.

Coming now to a consideration of the wiring diagram of FIGURE 6, a foot switch by means of which the operator operates the press brake is indicated generally at 101 and a selector switch is indicated generally at 102. These switches are diagrammatically shown. The selector switch is shown as having two positions, one indicated as "run" and the other indicated as "inch." The stars indicate which contacts are closed in each of the positions. The foot switch has three positions indicated at 1, 2, 3 and again the stars indicate which contacts are closed in each position.

Considering the ram to be in the full up position and the selector switch in the run position, it will be seen that the contacts 3, 4 and 7, 8 of the selector switch are closed. With these contacts closed, when the operator depresses the foot switch 101 to position 3, the contact 7, 8 of the switch 101 will be closed. In this diagram, a control relay is indicated at CR and a series of relay contactors CR1 to CR5 inclusive are actuated simultaneously by the relay CR. Some of these contactors and specifically CR1, CR3 and CR4 are normally open while CR2 and CR5 are normally closed. Thus, when CR is actuated, contactors CR1, CR3 and CR4 close and contactors CR2 and CR5 open.

The same situation applies to the relay AD which has associated with it the relay contactors AD1 to AD6 inclusive. Of these, AD1, AD4 and AD5 are normally closed while AD2, AD3 and AD6 are normally open. When AD is actuated, contactors AD1, AD4 and AD5 open and contactors AD2, AD3 and AD6 close. The relay U has associated with it the contactors U1, U2 and U4 of which U1 is normally open and U2 and U4 are normally closed, so that when the relay U operates the contactor U1 closes and the contactors U2 and U4 open.

Likewise, the relay D has associated with it the contactors D1, D2, D3 and D4 of which D2 and D4 are normally closed and D1 and D3 are normally open. When the relay D operates, the contactors D2 and D4 open and the contactors D1 and D3 close.

With these comments in mind, the wiring diagram can now be traced. With the selector switch in run position, the ram being in the top of its stroke and the foot switch in number 3 position, current flows through the contact 7 and 8 of the foot switch, through CR2, through the contacts 3, 4 of the selector switch, and through CR5 to energize the relay CR. This instantly opens CR5 but since CR1 is closed at the same time, CR will remain energized through the resistor $R_1$. Concurrently, of course, CR2 has opened so that the current from the contact 7, 8 of the foot switch now flows through AD1, through the up limit switch (up LS), contact 3, and through AD4 to energize the relay AD. Again this instantly opens the contactor AD4 but the contactor AD3 has concurrently closed so that AD is maintained energized through the resistor $R_2$, through AD3, PS and DLS back to the line.

Concurrently, also AD2 has closed and current flows through AD2, U2 and D4 to energize the relay D, and this closes the contact D1 to energize the down coil solenoid 54 which shifts the pilot valve 51 to down position and the ram starts downward at fast speed, provided the cam follower 22 is not on the cam plate 38. Since D3 is now closed, current is supplied to the speed control operated by the cam limit switch 20 and as the ram moves downward, the cam follower 22 is actuated by contacting the cam plate 38, the speed control switch closes energizing the differential valve solenoid coil 50a which shifts the differential valve 50 to slow position and the ram then slows down and moves at slow speed.

As the ram continues to move down, the relay AD has closed the contact AD6 and the red signal light R indicating down movement is energized.

When the ram arrives at the bottom of its stroke as determined by the bottom stop 41 actuating the actuating element 17, the down limit switch (down LS) will be opened and as will be clear this breaks the circuit through the relay AD. This reopens AD2 and deenergizes the down relay D to stop the downward movement of the ram. At the same time, AD1 has reclosed, supplying current to the up limit switch (up LS) which returned to contact number 2 as the ram was moving down. Thus, the up relay U is energized to establish a circuit through U1 to the up coil 53 which shifts the pilot valve 51 to up position. The ram then moves up until the up limit switch is opened or moved back from its number 2 to number 3 position, breaking the circuit through the up relay, whereupon the cycle is completed. If the operator continues to depress the foot switch 101, the cycle will repeat itself as long as the foot switch is held in position 3. The green light G is illuminated as the ram rises through AD5. It may be seen that in the run position, moving the foot switch 101 to position 2 at any time will cause the ram 14 to stop by breaking the contacts 7, 8. Releasing the foot switch 101 entirely breaks the contacts 7, 8 and makes the contacts 1, 2, causing the ram to rise because the relay U is energized through U4, D2, ULS to the line. When the top limit switch 18 contacts the upper stop 35, the ram 14 stops because ULS is shifted to the 1, 3 position, breaking the circuit and deenergizing the relay U.

If the selector switch 102 is moved to "inch" position, contacts 5 and 6 are connected so that if the foot switch is depressed to position 3, the ram moves down as before but now as the foot switch is released to position 2 or 1, the ram immediately stops and the ram may be inched down by depressing the foot switch to position 3 and releasing it to position 2 or 1. In FIGURE 6, a pressure switch is diagrammatically indicated and this is the pressure switch 79 of FIGURES 5 and 7. Switch PS is opened if the pressure in the system exceeds a predetermined value and this has the same effect on the system as the opening of the down limit switch and will cause the ram to rise until the upper limit switch 18 is actuated by the top stop 35. As shown in the wiring diagram in FIGURE 6, all the control relays are supplied by full wave rectified D.C. power supply.

Other details of the hydraulic and electrical circuit are fully described in copending applications, Serial No. 788,184, filed January 21, 1959, in the names of Hazelton, Grieheimer and Ostendorf, and Serial No. 804,378, filed April 6, 1959, in the names of Griesheimer and Koenig.

Only so much of the hydraulic circuit and electrical circuit has been shown in the present application as is necessary to an understanding of the operation of the various limit switches.

It will be clear that various modifications may be made without departing from the spirit of the invention and that we therefore do not intend to limit ourselves otherwise than as set forth in the claims which follow.

Having now fully described our invention, what we claim as new and desire to secure by Letters Patent is:

1. In a vertical press brake and the like having a frame, a bed, and a ram reciprocable on said frame with respect to said bed; a bracket secured to said bed and extending rearwardly therefrom free of said frame, a pair of mating bevel gears operatively mounted at the rear end of said bracket, a horizontal shaft passing through said bed, having a bearing in said bed and connected to one of said pair of bevel gears, a vertical shaft connected to the other of said pair of bevel gears, guide means for said vertical shaft secured to said frame and slidingly embracing said vertical shaft, said vertical shaft having a threaded portion, a bottom stop in threaded engagement with the threaded portion of said vertical shaft, means preventing rotation of said bottom stop, a bottom limit switch secured to said ram in a position to abut said bottom stop to terminate downward movement of said ram, and means for rotating said horizontal shaft for adjusting the vertical position of said bottom stop.

2. The structure of claim 1, wherein said last named means comprises a hand wheel secured to said horizontal shaft in front of said bed.

3. A structure according to claim 1, wherein indicating means are operatively connected to said horizontal shaft in front of said bed to indicate the position of said bottom stop.

4. The structure of claim 1, wherein said bottom stop has that portion thereof which is abutted by said bottom limit switch yieldably connected to that portion thereof which threadedly engages said vertical shaft, whereby to avoid damage in the event of over-run.

5. The structure of claim 4, wherein said limit switch has an actuating element adapted to abut said bottom stop and to be actuated thereby, and a protecting member secured to said limit switch in a position to abut said bottom stop after said actuating element, to protect said actuating element in the event of over-run.

6. The structure of claim 1, wherein that portion of said bottom stop which is abutted by said bottom limit switch is pivotally connected to that portion thereof which threadedly engages said vertical shaft, and spring means yieldably holding said first named portion in position to be abutted by said bottom limit switch, whereby to avoid damage in the event of over-run.

7. The structure of claim 6, wherein said limit switch has an actuating element adapted to abut said bottom stop and to be actuated thereby, and a protecting member secured to said limit switch in a position to abut said bottom stop after said actuating element, to protect said actuating element in the event of over-run.

8. The structure of claim 1, wherein a clamping rod is secured to said guide means parallel to said vertical shaft, a cam element slidable with respect to said vertical shaft and having a clamping device slidably engaging said clamping rod and provided with means to clamp said cam element with respect to said clamping rod, a switch secured to said ram and having a cam follower positioned to be actuated by said cam element during movement of said ram, said last mentioned switch being arranged to produce a change in the speed of movement of said ram.

9. The structure of claim 1, wherein a clamping rod is secured to said guide means parallel to said vertical shaft, a top stop slidable with respect to said vertical shaft and clamping rod and provided with means for clamping it to said clamping rod, a top limit switch secured to said ram in a position to abut said top stop to terminate upward movement of said ram.

10. The structure of claim 9, wherein said top and bottom stops have the respective portions thereof which are abutted by said limit switches yieldably connected to the remaining portion of said stops, whereby to avoid damage in the event of over-run.

11. The structure of claim 9, wherein the portion of said bottom and top stops which are abutted by the respective limit switches are pivotally connected to the remaining portions thereof and spring means are provided yieldably to hold the first named portion of each stop in position to be abutted by the respective limit switch, whereby to avoid damage in the event of over-run.

12. In a press brake and the like having a frame, a bed and a ram reciprocable on said frame with respect to said bed; a bracket secured to said bed and extending rearwardly therefrom free of said frame, a pair of mating bevel gears operatively mounted at the rear end of said bracket, a horizontal shaft passing through said bed, having a bearing in said bed and connected to one of said pair of bevel gears, a vertical shaft connected to the other of said pair of bevel gears, guide means for said vertical shaft secured to said frame and slidingly embracing said vertical shaft, said vertical shaft having a threaded portion, a clamping rod secured to said guide means parallel to said vertical shaft, a cam element slidable with respect to said vertical shaft and having a clamping device slidably engaging said clamping rod and provided with means to clamp said cam element with respect to said clamping rod, a top stop slidable with respect to said vertical shaft and clamping rod and provided with means for clamping it to said clamping rod, a bottom stop in threaded engagement with the threaded portion of said vertical shaft and slidably engaging said clamping rod, a top limit switch secured to said ram in a position to abut said top stop to terminate upward movement of said ram, a bottom limit switch secured to said ram in a position to abut said bottom stop to terminate downward movement of said ram, a switch secured to said ram and having a cam follower positioned to be actuated by said cam element during movement of said ram, said last mentioned switch being arranged to produce a change in the speed of movement of said ram, a hand wheel secured to said horizontal shaft in front of said bed for adjusting the vertical position of said bottom stop, and indicating means operatively connected to said horizontal shaft to indicate the position of said bottom stop.

References Cited in the file of this patent

UNITED STATES PATENTS

| | | |
|---|---|---|
| 737,210 | Colt | Aug. 25, 1903 |
| 1,232,711 | Mueller | May 10, 1917 |
| 2,110,593 | Ernst | Mar. 8, 1938 |
| 2,408,312 | Hubbert | Sept. 24, 1946 |
| 2,793,584 | Pearson | May 28, 1957 |

FOREIGN PATENTS

| | | |
|---|---|---|
| 208,551 | Australia | June 3, 1957 |
| 408,669 | Italy | June 5, 1945 |